United States Patent Office 2,935,412
Patented May 3, 1960

2,935,412
COMPOSITION FOR PROTECTING METALLIC STRUCTURES

Felix C. Gzemski, Springfield, and K. Duncan Ford, Wynnewood, Pa., assignors to The Atlantic Refining Company, Philadelphia, Pa., a corporation of Pennsylvania No Drawing. Application December 21, 1954
Serial No. 476,826

2 Claims. (Cl. 106—122)

The present invention relates to the insulation and protection of metallic structures and particularly metallic structures which are buried in the earth, such as pipes, conduits, and the like. In a more particular aspect, the present invention relates to insulating and corrosion protective materials for buried metallic structures which are capable of being applied in a granular form and can then be modified by heating the metallic structure to form a plastic zone immediately adjacent the exterior surface of the structure, a sintered zone surrounding the plastic zone and a third zone of loose particles surrounding the sintered zone.

It has heretofore been known that various structures, such as pipe lines, could be insulated and protected against corrosion by applying a variety of coating materials, particularly asphalts and asphalts containing various mineral and non-mineral fillers. These coatings have generally been applied by a molding process comprising applying heat and pressure to a suitable coating composition either in the shop or in the field. In addition, United States Patent No. 2,668,125 teaches that metallic structures may be effectively insulated by surrounding the metallic structure with a naturally-occurring asphaltic pyrobituminous material, such as gilsonite, in granular form and thereafter internally heating the metallic structure to form a plastic zone of bitumen on the surface of the structure, a sintered zone of bitumen surrounding the plastic zone and a zone of loose particles surrounding the sintered zone. It is this latter method of applying insulating and corrosion protective materials to which the present invention is particularly directed.

Although granular naturally-occurring bitumens are effective as insulating materials when applied in accordance with the procedure described above, there are also certain disadvantages inherent in the use of materials of this type. In the first instance, materials of this type are relatively expensive and must be used in quantities which make cost a serious factor. In addition, naturally-occurring bitumens by their very nature are non-uniform and vary greatly in their properties depending upon the source from which the material is obtained. For example, a natural bitumen from one source may be eminently suitable for its intended purpose while a similar material from a second source will exhibit properties so radically different that it is entirely ineffective. In addition, a given bitumen from a single source may be suitable for use under a given set of conditions whereas this same material cannot be used under another set of conditions. Further, there is no way in which the suitability or non-suitability of a given material can be accurately predicted without resorting to actual coating and performance trials employing the exact conditions under which the material is to be used.

It is therefore an object of the present invention to provide a composition and method for insulating and protecting against corrosion metallic structures which composition is economical and uniform in nature. Another object of the present invention is to provide a composition and method for insulating and protecting against corrosion metallic structures wherein the properties of the composition can be substantially duplicated from batch to batch. Still another object of the present invention is to provide a composition and method for insulating and protecting against corrosion metallic structures wherein the properties of the material can be adjusted in a predetermined manner to meet the peculiar needs of any type of service. These and other objects and advantages of the present invention will be more clearly understood by reference to the following detailed description and examples.

In accordance with the present invention it has been found that a mixture of granular petroleum asphalts wherein the softening point of the asphalt compounds differ by at least 25° F. as measured by ASTM Method E-28-51-T are excellent materials for the insulation and protection of metallic structures such as pipe lines and the like. It has also been found in accordance with the present invention that these mixtures of petroleum asphalts may be further modified to include porous inorganic materials such as expanded volcanic materials of the nature of perlite, volcanic ash, obsidian, tuff and the like and porous inorganic aggregates such as expanded vermiculite, haydite, pumice, scoria, etc.

Asphalts suitable for use in accordance with the present invention include modified and unmodified asphaltic materials derived from petroleum. Various methods for separating asphalts from petroleum containing the same and for modifying such asphalts are well known to those skilled in the art and therefore the detailed description of such methods will not be repeated here since these methods form no part of the present invention. One method of obtaining petroleum asphalts is by extracting crude petroleum containing asphaltic materials with solvents such as propane. In general, these extracted asphalts have softening points in the neighborhood of approximately 170° F. The extracted asphalt may thereafter be treated by conventional oxidizing procedures to vary the softening point of the asphalt or other physical properties may be likewise varied by known treating procedures. In general, asphalts suitable for use in accordance with the present invention include materials having softening points in the range of about 150° F. to 500° F.

In order to prepare petroleum asphalt for use in accordance with the present invention, the asphaltic material is reduced to granular form by grinding, flaking, and other known methods. The granulated asphalt should have a maximum particle size of about one inch in diameter and preferably should have a bulk a density of about 30 to 70 pounds per cubic foot. It has been found in accordance with the present invention, that by mixing at least two granulated asphalts having softening points which differ by at least 25° F., and preferably 25° F. to 200° F., substantially improved results are obtained as compared to the results obtained when the same two asphalts are first fused and then granulated.

The mixture of granulated asphalts may be applied to the metallic structure to be insulated and protected by surrounding the structure with the granulated material and thereafter heating the structure to form a fused zone adjacent the outer surface of the structure and a sintered zone surrounding the fused zone and in some cases where the nature of the service permits a third zone of loose granular materials surrounding the sintered zone. In the case of the protection of a pipe line which is to be buried in the earth, the pipe is placed in a trench larger than the exterior dimensions of the pipe and is supported above the bottom of the trench. The granular petroleum asphalt mixture is then poured in the trench to a height sufficient to cover the pipe and earth is then placed over the granulated asphalt to seal the top of the trench. In general, the thickness of the asphalt mixture around the pipe should be at least four inches and for pipes larger than four inches in diameter the thickness should be equal to the diameter. Thus, a two-inch pipe would need a four-inch thick layer around it—but a six-inch pipe would need a six inch layer for effective insulation. If the pipe line in question is to supply a heated fluid, such as steam, completion of the insulating operation is brought about by merely passing steam through the pipe line. In those cases where the pipe line is to be protected against corrosion and is to be used for carrying unheated fluids or gases, the structure is heated by extraneous means such as by steam, hot gases, an electric current or the like in order to form the desired protective zones in the granulated asphaltic mixture surrounding the pipe and thereafter heating is discontinued. Regardless of whether the pipe line or structure is to be employed for hot or cold service systems, the temperature employed to produce the desired protective zones in the asphaltic material surrounding the structure is preferably between the softening points of the petroleum asphalts employed, and in those cases where a granular expanded aggregate is present the temperature is preferably sufficiently high to melt a portion of the asphalt having the higher softening point. Of course in the case of a structure which is to contain or transmit hot fluids, the temperature of heating of the structure is preferably the same as the temperature of the fluids contained or transmitted by the structure. As has been pointed out heretofore, it has been found that a mixture of granulated petroleum asphalts having softening points which differ by at least 25° F. are substantially superior to either component of the mixture or to a mixture of the asphalts which has first been fused and then granulated. As will be seen from the following examples the ratio of the differing softening point asphalts may vary over an extremely wide range. However, where no expanded aggregate is present a volume ratio of 1:1 is preferred and where an expanded aggregate is present the ratio of total asphalt to expanded aggregate is preferably in this same general range. Example I below clearly shows the substantially improved results obtained by following the principles of the instant invention.

EXAMPLE I

A pipe line adapted for use in transporting steam was placed in a trench the dimensions of which exceeded the outside dimensions of the pipe by six inches. The pipe was supported above the base of the trench a distance of about six inches. The various asphalt and asphalt mixtures listed in Table 1 below were successively poured into the trench in granular form to a height of approximately six inches above the top surface of the pipe. Steam at a temperature of 350° F. was then passed through the pipe and the temperature at various distances from the outer surface of the pipe was measured continuously. When the temperatures being measured in the trench had reached substantially constant values, the steam was cut off and the asphalt surrounding the pipe was inspected. During this inspection the adhesion of the asphalt to the pipe was observed, the location and depth of any voids surrounding the pipe was observed, the thickness of the sintered zones surrounding the fused zone was measured and the thickness of the fused zone adjacent the pipe was also measured. In addition, observations were made as to whether the fused zone surrounding the pipe was uniform on all sides of the pipe. In runs 1 and 2 of Table 1, 100% of an oxidized asphalt having a softening point of 335° F. and 365° F., respectively, were employed alone in granular form. In run 3 a mixture of two asphalts which had first been fused to obtain a material having a softening point of 335° F. and then granulated, was employed. Runs 5 through 9, inclusive, in Table 1 include the preferred asphalt mixtures which form the basis of the present invention and which were first granulated and then mixed.

Table 1

| Run # | Vol. Percent and Softening Point of Asphalt | Temperature at Specified Distance From Pipe, ° F. | | | | | Thickness of Specified Zones | | Location and Depth of Voids | Adhesion to Pipe |
|---|---|---|---|---|---|---|---|---|---|---|
| | | 0 in. | 1 in. | 2 in. | 3 in. | 4 in. | Fused | Sintered, in. | | |
| 1 | 100%—335° F | 350 | 250 | 204 | 160 | 120 | Average ½ in. (non-uniform) | 1½ | Above pipe—2 in. | Good. |
| 2 | 100%—365° F | 350 | 248 | 195 | 152 | 122 | ____do____ | 2½ | Below pipe—½ in. | Poor. |
| 3 | 100%—335° F | 350 | 244 | 192 | 155 | 103 | Average 2 in. (non-uniform) | 1 | Above pipe—2 in. | Good. |
| 4 | 100%—365° F | 350 | 238 | 182 | 148 | 109 | Average ½ in. (non-uniform) | 1½ | Below pipe—½ in. | Poor. |
| 5 | {50%—335° F / 50%—365° F} | 350 | 242 | 198 | 145 | 110 | 1½ in. (uniform) | 1½ | None | Good. |
| 6 | {50%—300° F / 50%—365° F} | 350 | 242 | 173 | 146 | 115 | 2½ in. (uniform) | 1 | ____do____ | Do. |
| 7 | {50%—300° F / 50%—365° F} | 350 | 250 | 195 | 152 | 106 | 2 in. (uniform) | 1 | ____do____ | Do. |
| 8 | {50%—335° F / 50%—365° F} | 350 | 255 | 190 | 141 | 104 | ____do____ | 1 | ____do____ | Do. |
| 9 | {50%—325° F / 50%—360° F} | 350 | 256 | 200 | 164 | 119 | 1½ in. (uniform) | 1 | ____do____ | Do. |

It is to be observed from the data reported in Table 1 that in those cases in which a single granulated asphalt or a prefused mixture of asphalts was employed extremely poor results were obtained. In some caess the fused zone was either too thin or too thick and in some cases the adhesion to the pipe was poor. In addition, in all cases where a single asphalt or a prefused mixture of asphalts was employed, the fused zone surrounding the pipe was non-uniform, in some cases being thinner at the top than at the bottom while in some cases the top portion was thicker than the bottom, and in addition the fused zone contained large void spaces adjacent the pipe either at the top or at the bottom. On the other hand, where the composition of the present invention was applied, adhesion to the pipe was good, the thickness of both the fused zone and the sintered zone were adequate, no voids were present in the fused zone and the fused zone was substantially uniform on all sides of the pipe.

It has also been discovered in accordance with the present invention that the asphalt mixtures of the instant invention may be further modified by the incorporation therein of porous aggregate materials such as expanded perlite, expanded vermiculite and the like. The use of such porous materials in a composition of the present invention serves to further reduce the cost of the insulating and protective materials without reducing the effectiveness of the insulation or protection. In addition, these materials add structural strength to the composition and in some cases additional insulating properties of their own. Where the porous aggregate material is hydrophilic in nature, it is preferable to precoat the aggregate with one of the asphalts to be employed, or similar asphalt or asphaltic resin. This coating of the porous material serves to water-proof the material and also raise the density of the porous material thus preventing stratification when the mixture is poured into a trench or other container. Various methods of coating coarse aggregate materials are known in the art and form no part of the instant invention. Suitable methods include adding melted or powdered asphalt to the hot porous material, tumbling the porous material in a melted asphalt or other known means of coating. In some instances where the porous material contains interconnected pore spaces, it is often desirable to mix porous material with water or a volatile solvent prior to coating to prevent the asphalt from entering and filling the pores of the aggregate. As has been indicated above, the coating material may be either the asphalt having the higher softening point or the asphalt having the lower softening point. The coated porous material is then mixed with the other asphalt employed in accordance with the present invention or with an additional amount of the asphalt which has been used in coating, which is in granular form, plus a second asphalt having a softening point differing from the coating asphalt by at least 25° F. The use of a mixture of two asphalts having softening points which differ by at least 25° F. in which one asphalt has been used to coat a porous aggregate material is illustrated in Example II below.

EXAMPLE II

The procedure followed in Example I above was repeated in the present example, except that the lower softening point asphalt was employed to coat an inorganic granular material. As is obvious from Table 2 below, in runs 1 and 2 a granular expanded perlite was coated with an asphalt having a softening point of 185° F. and was then mixed with a second asphalt having a softening point which exceeds that of the first by at least 25° F. In run 3 of Table 2 a 185° F. softening point asphalt was employed to coat sand and the coated sand was then mixed with an asphalt having a softening point of 325° F. The same measurements and observations made in Example I were repeated in the instant example.

It is to be observed from a study of the results reported in Table 2 that the mixture of precoated sand and asphalt was substantially inferior to the mixture of precoated perlite and asphalt. In the case of the composition containing sand, the top surface of the pipe was completely exposed, no sintered zone existed and a highly non-uniform fused zone averaging approximately 3½ inches was found.

The porous inorganic material which may be employed in accordance with the present invention should have a particle size equivalent to the particle size of the asphalt with which it is mixed and should preferably be in the range of about 1/16 to 1/8 inch in diameter.

Known agents for bonding asphalt porous aggregates may also be employed in the practice of the present invention without departing from the spirit thereof. In addition, the expanded inorganic material may be coated by contact with cut back asphalt, with asphalt emulsions, or in any other manner known to the art.

We claim:

1. A composition for the insulation and protection of metallic structures comprising a first granular petroleum asphalt and a granular expanded perlite coated with a second petroleum asphalt, the volume ratio of total asphalts to perlite being approximately 1:1, said first and said second petroleum asphalts being characterized by having ASTM softening points in the range of 150° F. to 500° F. and separated from one another by at least 25° F. and the volume ratio of the higher softening point asphalt to the lower softening point asphalt ranging between 10:1 and 1:1, said composition being further characterized by forming a plastic zone immediately adjacent the outer surface of said structures, a sintered zone surrounding said plastic zone and a zone of loose granules surrounding said sintered zone when said composition is heated to a temperature sufficiently high to melt a portion of the asphalt.

2. A composition for the insulation and protection of underground steam conduits comprising granular particles of a first petroleum asphalt, and a granular expanded perlite coated with a second petroleum asphalt, the volume ratio of the total asphalts to perlite being approximately 1:1, said first and said second petroleum asphalts being characterized by having ASTM softening points separated from one another by at least 25° F. and spanning the temperature of said steam conduit, the volume ratio of the higher softening point asphalt to the lower softening point asphalt ranging between 10:1 and 1:1, said composition being further characterized by forming a plastic zone immediately adjacent the outer surface of said steam conduit, a sintered zone surrounding said plastic zone and a zone of loose granules surrounding said sintered zone when said composition is at the temperature of the steam conduit.

*Table 2*

| Run # | Vol. Percent and Softening Point of Asphalt Components | Vol. Percent of Aggregate | Temperature at Specified Distance from Pipe, °F. | | | | | Thickness of Specified Zones | | Location and Depth of Voids | Adhesion To Pipe |
|---|---|---|---|---|---|---|---|---|---|---|---|
| | | | 0 in. | 1 in. | 2 in. | 3 in. | 4 in. | Fused | Sintered | | |
| 1 | 50%—296° F.<br>5%—185° F. | 45%—Perlite | 350 | 272 | 212 | | 135 | 1½ in. (uniform) | 1 in. | None | Good. |
| 2 | 50%—325° F.<br>5%—185° F. | ----do---- | 366 | 254 | 202 | 178 | 134 | ----do---- | 1½ in. | ----do---- | Do. |
| 3 | 50%—325° F.<br>5%—185° F. | 45%—Sand | 350 | 253 | 215 | 182 | 125 | Average 3½ in. (non-uniform). | None | Top completely exposed. | Do. |

References Cited in the file of this patent

UNITED STATES PATENTS

| | | |
|---|---|---|
| 1,603,961 | Liais | Oct. 19, 1926 |
| 1,662,377 | Downard | Mar. 13, 1928 |
| 1,736,915 | Illemann | Nov. 26, 1929 |
| 1,778,461 | Nicholson | Oct. 14, 1930 |
| 2,332,219 | Harshberger | Oct. 19, 1943 |
| 2,446,903 | Bright | Aug. 10, 1948 |
| 2,625,512 | Powell | Jan. 13, 1953 |
| 2,634,208 | Miscall | Apr. 7, 1953 |
| 2,668,125 | Baker et al. | Feb. 2, 1954 |